United States Patent
Otsubo et al.

(10) Patent No.: US 11,548,068 B2
(45) Date of Patent: Jan. 10, 2023

(54) METHOD OF PRODUCING SPHERICAL SILVER POWDER

(71) Applicant: DOWA Electronics Materials Co., Ltd., Tokyo (JP)

(72) Inventors: Kemmei Otsubo, Okayama (JP); Koji Hirata, Honjyo (JP)

(73) Assignee: DOWA Electronics Materials Co., Ltd., Tokyo (JP)

( * ) Notice: Subject to any disclaimer, the term of this patent is extended or adjusted under 35 U.S.C. 154(b) by 51 days.

(21) Appl. No.: 17/260,220

(22) PCT Filed: Jul. 17, 2019

(86) PCT No.: PCT/JP2019/028139
§ 371 (c)(1),
(2) Date: Jan. 14, 2021

(87) PCT Pub. No.: WO2020/017564
PCT Pub. Date: Jan. 23, 2020

(65) Prior Publication Data
US 2021/0268583 A1    Sep. 2, 2021

(30) Foreign Application Priority Data
Jul. 17, 2018   (JP) ............................. JP2018-134378

(51) Int. Cl.
*B22F 9/24*   (2006.01)
*B82Y 30/00*   (2011.01)

(52) U.S. Cl.
CPC .......... *B22F 9/24* (2013.01); *B22F 2301/255* (2013.01); *B22F 2304/058* (2013.01); *B22F 2304/10* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 2011/0180764 A1 | 7/2011 | Takahashi et al. | |
| 2015/0203700 A1* | 7/2015 | Lee .................... | B01J 13/0043 106/31.92 |
| 2018/0207728 A1* | 7/2018 | Teramoto ............... | B82Y 40/00 |

FOREIGN PATENT DOCUMENTS

| | | |
|---|---|---|
| CN | 101287566 A | 10/2008 |
| CN | 106614736 A | 5/2017 |
| EP | 3232445 A1 | 10/2017 |

(Continued)

OTHER PUBLICATIONS

English translation of JP 2010-070793-A (originally published Apr. 2, 2010) from PE2E search.*

(Continued)

*Primary Examiner* — George Wyszomierski
(74) *Attorney, Agent, or Firm* — Kenja IP Law PC

(57) ABSTRACT

Provided is a method of producing spherical silver powder, which makes it possible to easily produce spherical silver powder having primary particle diameters with less variation than conventional powder and spherical silver powder obtained by the method.

The method of producing spherical silver powder includes a reduction precipitation step of precipitating silver particles by reduction by adding a reductant including hydrazine carbonate to an aqueous reaction system containing silver ions.

4 Claims, 6 Drawing Sheets

(56) References Cited

FOREIGN PATENT DOCUMENTS

| | | |
|---|---|---|
| JP | 2005220380 A | 8/2005 |
| JP | 2009235474 A | 10/2009 |
| JP | 2010070793 A | 4/2010 |
| KR | 100507638 B1 | 8/2005 |
| WO | 2014104032 A1 | 7/2014 |
| WO | 2016093223 A1 | 6/2016 |

OTHER PUBLICATIONS

Dec. 20, 2021, the Extended European Search Report issued by the European Patent Office in the corresponding European Patent Application No. 19837339.1.
Oct. 15, 2019, International Search Report issued in the International Patent Application No. PCT/JP2019/028139.
Jan. 19, 2021, International Preliminary Reporton Patentability issued in the International Patent Application No. PCT/JP2019/028139.
Aug. 30, 2022, Office Action issued by the China National Intellectual Property Administration in the corresponding Chinese Patent Application No. 201980045792.5.

* cited by examiner

METHOD OF PRODUCING SPHERICAL SILVER POWDER

TECHNICAL FIELD

This disclosure relates to a method of producing spherical silver powder. This disclosure particularly relates to spherical silver powder used in a conductive paste used to form an internal electrode of a multilayer capacitor and circuits of solar cells, plasma display panels, and touch panels.

BACKGROUND

Conventionally, as a method for forming an internal electrode of a multilayer capacitor, conductive patterns of a circuit board, electrodes and circuits of solar cells and plasma display panels, for example, the following method is widely used. A conductive paste of a sintered type produced by adding silver powder and glass frit into an organic vehicle and kneading the mixture is formed into a predetermined pattern on a substrate, followed by heating at a temperature of 500° C. to remove organic components, thereby sintering the particles of the silver powder.

A conductive paste used for such an application is required to be capable of being formed into a conductive pattern having higher density and a finer line (smaller line width) in order to obtain smaller electronic components. Accordingly, silver powder to be used is required to have a reasonably small diameters and similar particle sizes and to be dispersed in an organic vehicle.

A wet reduction process is known as a method of producing silver powder for such conductive paste. For example, in JP 2005-220380 A (PTL 1), a reductant is added to an aqueous reaction solution containing silver ions thereby precipitating spherical silver powder by reduction.

Further, as a method of producing spherical silver powder of uniform particle diameter, JP 2009-235474 A (PTL 2) proposes a method of precipitation by reduction in which seed particles are added before the reduction, whereas JP 2010-070793 A (PTL 3) proposes a method of precipitation by reduction in which an aqueous solution containing silver ions and an aqueous solution containing a reductant are flown through different channels and then brought into contact and mixed. On the other hand, as a method of producing copper powder, WO 2014/104032 A (PTL 4) proposes a method of precipitation by reduction using a plurality of reductants.

CITATION LIST

Patent Literature

PTL 1: JP 2005-220380 A
PTL 2: JP 2009-235474 A
PTL 3: JP 2010-070793 A
PTL 4: WO 2014/104032 A

SUMMARY

Technical Problem

As stated above, as electronic components are reduced in size, there is a demand for conductive paste that can be used to form finer wiring patterns. Here, mixing of coarse particles in powder used in conductive paste causes patchiness of printing using the conductive paste, which would result in a broken wire. Moreover, when spherical silver powder of nonuniform particle diameter is made into a paste, the viscosity characteristics vary, which makes it difficult to provide stable printing characteristics.

In the preparation of an electrode used for a solar cell, sintering is performed for a sintering time of usually several tens of seconds that is significantly short. In sintering, if a large number of coarse particles are contained in the conductive paste, the conductive paste would be insufficiently sintered, whereas if a large number of fine particles are contained in the conductive taste, sintering of the conductive paste is promoted, which would cause excessive sintering. Accordingly, also in order to achieve an appropriate sintering state in a short time, a technique for appropriately controlling the particle diameter of spherical silver powder is very important.

For the reasons as described above, there is a demand for spherical silver powder having particle diameters with little variation.

The methods of producing metal powder of uniform particle diameter, disclosed in PTLs 2 to 4 have the following problems.

First, as in PTL 2, in a production method using seed particles, a step of preparing the seed particles is added, thus the production process is complicated. Further, a dispersant used for the preparation of the seed particles would cause side effects in the preparation of intended particles.

Further, as in PTL 3, in a method of precipitation by reduction in which an aqueous solution containing silver ions and a reductant aqueous solution are flown through different channels and then brought into contact and mixed, when a silver mirror reaction occurs in a contact pipe, the pipe would be clogged.

As in PTL 4, in a method using a plurality of reductants, the effluent treatment would be more complicated than in the case of using one reductant alone, which results in increased production cost.

It could therefore be helpful to provide a method of producing spherical silver powder, which makes it possible to easily produce spherical silver powder having primary particle diameters with less variation than conventional powder.

Solution to Problem

As a result of intensive studies to solve the above problems, we found that spherical silver powder of uniform primary particle diameter can be produced by adding hydrazine carbonate as a reductant to an aqueous solution containing silver ions, thereby precipitating silver particles by reduction. The reason the primary particle diameters are more uniform in the case of using hydrazine carbonate as a reductant as compared with the case of using a hydrazine aqueous solution (hydrazine hydrate) is not clear. However, since the reduction starts after the desorption of carbonic acid attached to hydrazine carbonate molecules $(NH_2NH_2)_2 \cdot CO_2$, a window for sufficient dispersion of unreacted hydrazine $(N_2H_4)$ in an aqueous reaction system containing silver ions will be obtained between the addition of the reductant and the start of reduction, thus homogeneous nucleation and growth would be found in the mixed solution of the aqueous reaction system containing silver ions and the hydrazine carbonate.

This disclosure is based on the above findings, and we specifically propose the following features.

(1) A method of producing spherical silver powder, comprising a reduction precipitation step of precipitating silver particles by reduction by adding a reductant including hydrazine carbonate to an aqueous reaction system containing silver ions.

(2) The method of producing spherical silver powder, according to (1) above, wherein an amount of the hydrazine carbonate added in the reduction precipitation step is 1 to 6 molar equivalents per silver.

(3) The method of producing spherical silver powder, according to (1) or (2) above, wherein the aqueous reaction system containing the silver ions is a silver ammine complex, and the silver ammine complex is prepared by adding one of aqueous ammonia and ammonium salt to an aqueous solution containing at least one of silver nitrate, a silver complex, and a silver intermediate.

(4) The method of producing spherical silver powder, according to any one of (1) to (3) above, wherein a temperature of the aqueous reaction system containing the silver ions when the reductant is added in the reduction precipitation step is 10° C. to 50° C.

(5) The method of producing spherical silver powder, according to any one of (1) to (4) above, wherein a cumulative 50% particle diameter D50 of SEM primary particle diameters of the resultant spherical silver powder is 0.1 μm to 1.5 μm, and a variation coefficient of the SEM primary particle diameters in a particle size distribution is 0.2 or less.

Advantageous Effect

This disclosure can provide a method of producing spherical silver powder, which makes it possible to easily produce spherical silver powder having primary particle diameters with less variation than conventional powder.

DETAILED DESCRIPTION

Figure 1:
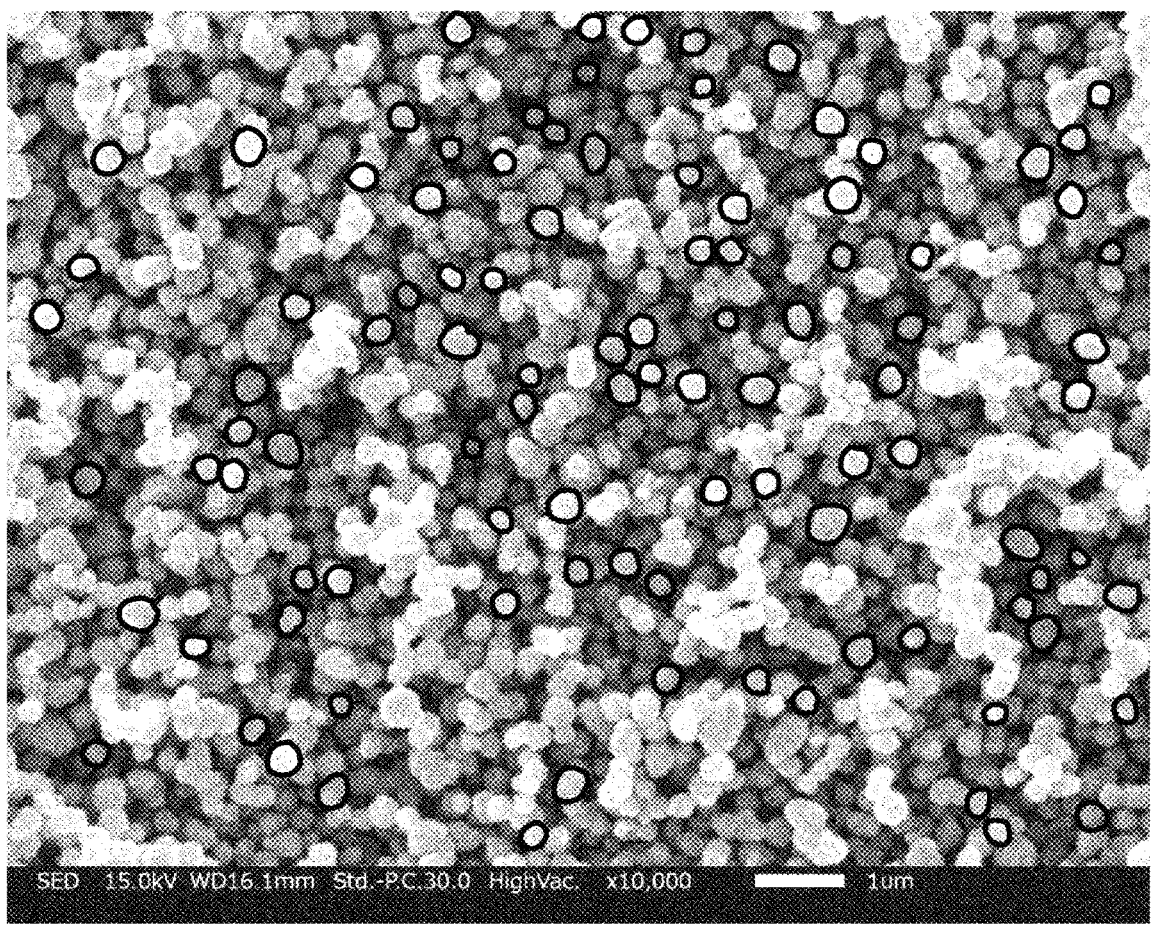
FIG. 1 is a SEM micrograph of spherical silver powder obtained in Example 1.

A "SEM primary particle diameter" herein refers to the primary particle diameter found using a scanning electron microscope (SEM). The particle diameter D50 at a cumulative percentage of 50% of the SEM particle diameters is found as follows. Silver particles are observed under a scanning electron microscope (SEM) at 10000× magnification, and of silver particles (primary particles) observed in a randomly selected field of view, 100 silver particles are randomly selected from silver particles that do not overlap or join with other particles and have a clear outline. The particle diameter of each silver particle is found as an equivalent circle diameter (Heywood diameter) using image analyzing particle size distribution measurement software (Mac-View available from Mountech Co., Ltd.), and the 50% particle diameter meaning that the cumulative percentage in the particle size distribution based on the particle number is 50% is found.

The disclosed method of producing spherical silver powder includes a reduction precipitation step for precipitating silver particles by reduction. The method may include other appropriately selected steps as necessary. Examples of other steps include a silver ion dispersion liquid preparation step, a dispersant adsorption step, a recovery cleaning step, a drying step, and a dry process step. Namely, the disclosed method of producing spherical silver powder can optionally include a silver ion dispersion liquid preparation step, a dispersant adsorption step, a recovery cleaning step, a drying step, and a dry process step in addition to the reduction precipitation step of precipitating silver particles by reduction.

Embodiments of this disclosure will be described in the following order including specific aspects.

1-A) Silver ion dispersion liquid preparation step
1-B) Reduction precipitation step
1-C) Dispersant adsorption step
1-D) Recovery cleaning step
1-E) Drying step
1-F) Dry process step 1-A) Silver Ion Dispersion Liquid Preparation Step This step is a step of preparing a silver ion dispersion liquid for producing silver particles that form raw material for spherical silver powder. The silver ion dispersion liquid obtained in this step can be used as an aqueous reaction system containing silver ions.

As the aqueous reaction system containing silver ions, an aqueous solution or a slurry that contains at least one of silver nitrate, a silver complex, and a silver intermediate can be used. Use of seed particles serving as growth nuclei of silver particles is possible but makes the reaction system complicated; accordingly, it is more preferred that seed particles are preferably not used.

An aqueous solution containing a silver complex can be prepared by adding aqueous ammonia or an ammonium salt to a silver nitrate aqueous solution or a silver oxide suspension. Of those, in order to make the spherical silver powder have an appropriate particle diameter and a spherical shape, a silver ammine complex aqueous solution obtained by adding aqueous ammonia to a silver nitrate aqueous solution is preferably used.

Since the coordination number of ammonia in the silver ammine complex is 2, 2 mol of ammonia per 1 mol of silver reacts. One molar equivalent of ammonia per silver is preferably added, and more preferably 2 molar equivalents of ammonia is preferably added. Here, 1 molar equivalent of ammonia corresponds to 2 mol of ammonia per 1 mol of silver. Further, with a view to facilitating the reaction of the complex to some extent, the amount of ammonia added may be 8 molar equivalents of ammonia per silver, more preferably 6 molar equivalents or less. A pH adjuster may be added to the aqueous reaction system containing silver ions. As the pH adjuster, a typical acid or base may be used, and examples include nitric acid and sodium hydroxide.

The silver intermediate mentioned above refers to a substance produced during the reaction for obtaining an objective substance, and examples of silver intermediates include silver oxide ($Ag_2O$) and silver carbonate ($Ag_2CO_3$). These intermediates are dissolved when ammonia is added during the process of producing an ammine complex, and most of silver ions form silver ammine complexes.

1-B) Reduction Precipitation Step

In this step, silver is precipitated from an aqueous reaction system containing silver ions (silver ion dispersion liquid) by reduction using a reductant.

Hydrazine carbonate is used as the reductant. The term "hydrazine carbonate" herein includes a hydrazine carbonate aqueous solution obtained by diluting hydrazine carbonate. Since any reductant other than hydrazine carbonate is preferably not used, "hydrazine carbonate" preferably does not include types of reductants different from compounds having an aldehyde group. Further, to facilitate effluent treatment, a reductant is preferably used only in this step, in which case the reductant is used only in 1-B) Reduction step after 1-A) Silver ion dispersion liquid preparation step. Hydrazine carbonate used may be, for example, a product commercially available from Otsuka Chemical Co., Ltd. or JAPAN FINECHEM COMPANY, INC. Alternatively, a solution prepared by bubbling carbon dioxide gas in a typical hydrazine aqueous solution (which may partly contain hydrazine that does not form a carbonate as long as hydrazine carbonate constitutes over 50%).

The amount of the reductant may be set to 1 molar equivalent or more per silver in order to increase the reaction yield of silver, or may be set to 1.1 molar equivalents or more. On the other hand, an excessive use of the reductant would increase the material cost and the cost of effluent treatment. Accordingly, the amount of the reductant added is preferably 6 molar equivalents or less per silver, more preferably 5 molar equivalents or less. Further, when hydrazine carbonate is added to the aqueous reaction system containing silver ions, the concentration of hydrazine carbonate is preferably in a range of 1% to 70% by mass. Hydrazine carbonate has the molecular formula $(N_2H_4)_2 \cdot CO_2$, and one molecule has properties of two normal hydrazine molecules. Since hydrazine emits four electrons when reduced, $\frac{1}{8}$ mol of hydrazine carbonate per 1 mol of silver reacts. Namely, 1 molar equivalent of hydrazine carbonate per silver corresponds to $\frac{1}{8}$ molar equivalents of hydrazine carbonate per 1 mol of silver.

Further, in this step, when the reductant is added, the temperature of the aqueous reaction system containing the silver ions is preferably 10° C. to 50° C., more preferably 20° C. to 40° C. A preferred temperature range of the aqueous reaction system is 20° C. to 40° C. When the temperature is high, carbonate separation is accelerated, which would make it impossible to make time for unreacted hydrazine ($N_2H_4$) to sufficiently diffuse; whereas when the temperature is low, the reaction of hydrazine after carbonate separation becomes less active, which would result in insufficient reduction precipitation.

Further, this step may be performed by either continuous mixing or batch mixing. Note that in the case of the batch mixing process, the time required for the whole quantity of the reductant to be mixed with the aqueous reaction system containing silver ions (that is, the silver ion dispersion liquid) is preferably as short as possible. In the batch mixing process, as the volume (the yield of silver powder in the batch process) increases, it becomes difficult to mix the reductant in a short time. Although the silver ion dispersion liquid is sufficiently stirred during mixing, if a reduction precipitation reaction occurs while the reductant concentration varies between a region closer to the area where the reductant is introduced and a region farther therefrom in the silver ion dispersion liquid, it would cause an increase in the variation of the primary particle diameters of the spherical silver powder obtained.

To address this, hydrazine carbonate is used as a reductant in this disclosure unlike in conventional techniques. When hydrazine carbonate is used, there is a time after the contact of the reductant with the aqueous reaction system containing silver ions before a reduction reaction starts (window time). This allows the reductant to be stirred and ensures a longer time for reducing the variation in the concentration of the reductant. Comparison of the yields of silver powder in the batch process for the same volume indicates that this disclosure is advantageous in that spherical silver powder with little variation of the primary particle diameter can be produced more easily than using conventional techniques. On the other hand, a comparison performed for different volumes indicates that this disclosure is advantageous in that high-volume productivity (that is, the capability of producing a large quantity of silver powder simultaneously and uniformly) can be enhanced.

Although using, as a hydrazine derivative other than hydrazine carbonate, for example, hydrazine hydrochloride or hydrazine sulfate as a reductant is possible; chloride components or sulfide components in those molecules would react with silver to generate silver chloride or silver sulfide. Further, chlorine components or sulfur components remaining in the powder after sintering would accelerate corrosion. Moreover, other hydrazine compounds are obtained by partially subjecting hydrazine to a substitution reaction, so that the number of electrons emitted by one molecule is small, which would increase the amount of the reductant required to be mixed. Further, the additional cost of subjecting hydrazine to a substitution reaction increases the cost of producing spherical silver powder, and the effluent treatment is expected to cost more than the case of using normal hydrazine. For the above reasons, hydrazine carbonate is suitable as a reductant in this disclosure.

1-C) Dispersant Adsorption Step

In this step, a dispersant is made to be adsorbed onto the surface of each silver particle.

Adding the dispersant into the liquid before the reduction precipitation of the spherical silver powder and after the reduction precipitation allows the dispersant to be adsorbed onto the silver particle surfaces. The addition of the dispersant may be performed only before the reduction, only after the reduction, or both before and after the reduction.

The amount of the dispersant such as an organic substance added in the adsorption step is preferably 0.05% by mass or more and 3.0% by mass or less in total per the mass of the silver powder, more preferably 0.1% by mass or more and 1.0% by mass or less.

The dispersant is not limited, and may be appropriately selected depending on the intended use. Examples include aliphatic acids and their salts, surfactants, metalorganic compounds, chelating agents, and polymeric dispersants. One dispersant may be used alone, or two or more dispersants may be used together.

1-D) Recovery Cleaning Step

After all the above steps, in this step, the silver particles obtained are recovered and cleaned. The recovery and cleaning may be performed in separate steps, may be repeated a plurality of times, or may be performed simultaneously.

Since the silver powder obtained through the above reduction step usually contains impurities, it is preferably cleaned. Purified water is suitable as a cleaning solvent used here.

The methods of recovery and cleaning are not limited and can be selected appropriately depending on the intended uses. Examples include decantation and filtration. The end of cleaning can be determined based on the electrical conductivity of the wafer after cleaning, and the cleaning is preferably performed until the conductivity becomes 0.5 mS/m or less.

1-E) Drying Step

In this step, an aggregate of the silver particles obtained in the recovery cleaning step is dried.

The aggregate of the silver particles obtained in the recovery cleaning step forms a water-rich cake or slurry. Thus, in order to make the silver particles available as silver powder in the end, water is required to be removed from the cake or slurry.

Examples of the method of water removal include blowing dry air, reducing pressure, immersion in a drying solvent, blowing off with compressed-air, and driving off by centrifugal force. An easy way is to warm the product under reduced pressure. The drying temperature is preferably 100° C. or less at which the sintering between the silver particles can be prevented.

1-F) Dry Process Step

The silver powder obtained in the drying step may be subjected to dry process steps such as a dry disintegration process and a classification process. Further, a surface smoothing process by which angular portions on the surfaces of the silver particles are removed by charging silver powder into a device capable of mechanically fluidizing silver powder to make the silver particles of the silver powder mechanically collide with each other. In addition, the disintegration and the smoothing process may be followed by the classification process. Note that an integral unit capable of drying, grinding, and classification may be used to perform drying, grinding, and classification. The particle diameter (D50) at a cumulative percentage of 50% of the SEM primary particle diameters of the spherical silver powder obtained through the above steps can be 0.1 μm to 1.5 μm, and the variation coefficient of the SEM primary particle diameters in the particle size distribution can be 0.2 or less. The D50 can even be 0.2 μm to 1.0 μm.

The above method of producing spherical silver powder according to this disclosure does not need to use an expensive reagent or a complicated process as compared with conventional production methods, and allows for effluent treatment in the like manner as in the case of using a conventional hydrazine aqueous solution. Accordingly, the production cost is not necessarily increased significantly. According to this disclosure spherical silver powder having primary particle diameters with less variation than conventional powder can easily be produced. Spherical silver powder obtained by this producing method has primary particle diameters with little variation.

EXAMPLES

Examples of spherical silver powder according to this disclosure will be described below in detail. However, this disclosure is not limited to the following examples.

Example 1

A silver ammine complex aqueous solution was obtained by preparing 3.2 L of a silver nitrate aqueous solution containing 0.12 mol/L of silver ions and adding 137.7 g (2.7 molar equivalents per silver) of aqueous ammonia with a concentration of 28% by mass to the silver nitrate aqueous solution. Further, 14.6 g of an aqueous solution containing 70% by mass of hydrazine carbonate (produced by Otsuka Chemical Co., Ltd., 1.8 molar equivalents per the amount of silver) was diluted with 131.4 g of purified water to obtain a reductant. The liquid temperature of the silver ammine complex aqueous solution was kept at 30.0° C. and the reductant was mixed into the silver ammine complex aqueous solution fully stirred, thereby obtaining a slurry containing silver powder. Discoloration of the solution started at 1.0 s after the mixing, which indicated that a reduction precipitation reaction occurred.

Further, 3.6 g of a solution obtained by diluting ethanol with 5.0% by mass of oleic acid was added as a dispersant to the slurry containing silver powder obtained, followed by full stirring and aging. The amount of the oleic acid added was 0.4% by mass with respect to the mass of the silver powder. The aged slurry was subjected to filtration and water washing, and then dried at 73° C. for 10 hours using a vacuum dryer. After that, the resultant dry powder was charged into a disintegrator (SK-M10 manufactured by KYORITSU RIKO K.K.) and a disintegration for 30 s was repeated twice. Thus, spherical silver powder of Example 1 was obtained.

The spherical silver powder obtained in Example 1 was micrographed at 10000× magnification using a scanning electron microscope (SEM). The image taken is given in FIG. 1.

Further, for the SEM image (FIG. 1) taken, the particle size distribution of the primary particle diameters of the silver particles in the resultant spherical silver powder was analyzed using image analysis software (Mac-View available from Mountech Co., Ltd.).

Figure 2:
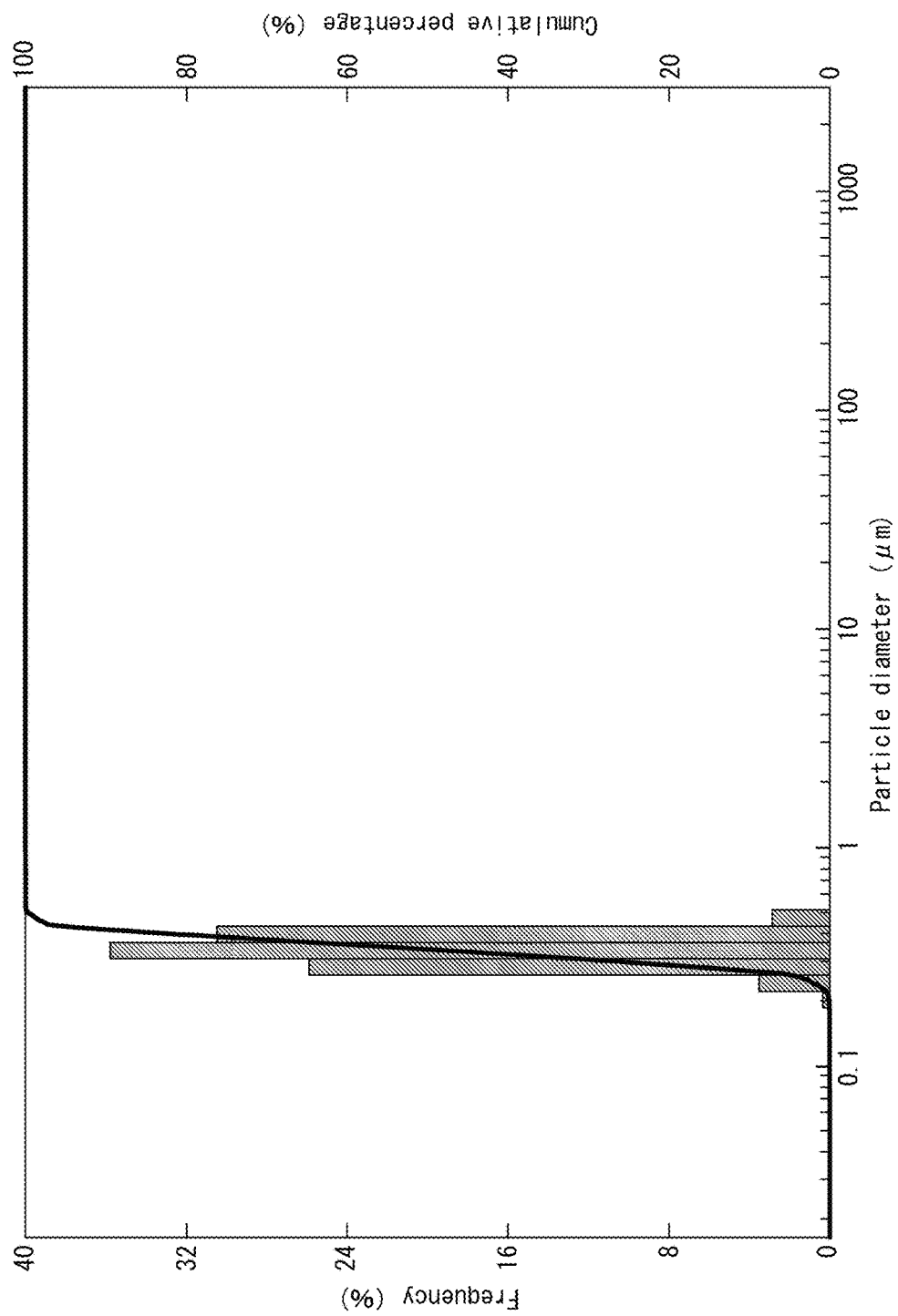
FIG. 2 gives the results of particle size distribution analysis of primary particle diameters in the SEM micrograph obtained in Example 1.

The analysis software calculates the particle area by tracing the outline of a given particle and converting the area into an equivalent circle diameter (Heywood diameter), thereby calculating the particle size. This calculation is performed on 100 particles in the image and the results are plotted as a particle size distribution. The particle size distribution is given in FIG. 2. The particles to be analyzed were selected from the particles that did not overlap or join with other particles and had a clear outline in the SEM image. When the particle size distribution had a narrow profile width, the standard deviation was small and the variation of the particle size was small, meaning that uniform silver powder was obtained. Further, for different particle diameters, a variation coefficient was determined to relatively evaluate the particle size variation. The variation coefficient was obtained by dividing the standard deviation of the particle size distribution found from the SEM primary particle diameters by D50, and was indicative of the variation of the SEM primary particle diameters.

The results of the analysis demonstrated that the particle diameter (D50) at a cumulative percentage of 50% of the spherical silver powder was 0.34 μm, the standard deviation of the particle size distribution was 0.063 μm, and the variation coefficient was 0.185.

Example 2

A silver ammine complex aqueous solution was obtained by preparing 3.2 L of a silver nitrate aqueous solution containing 0.12 mol/L of silver ions and adding 137.7 g (2.7 molar equivalents per silver) of aqueous ammonia with a concentration of 28% by mass to the silver nitrate aqueous solution. Further, 14.6 g of an aqueous solution containing 70% by mass of hydrazine carbonate (produced by Otsuka Chemical Co., Ltd., 1.8 molar equivalents per the amount of silver) was diluted with 131.4 g of purified water to obtain a reductant. The liquid temperature of the silver ammine complex aqueous solution was kept at 30.0° C. and the reductant was mixed into the silver ammine complex aqueous solution fully stirred after adding as a dispersant 0.59 g of a stearate emulsion (0.2% by mass per silver in terms of stearic acid), thereby obtaining a slurry containing silver powder. Discoloration of the solution started at 1.2 s after the mixing, which indicated that a reduction precipitation reaction occurred.

Further, 3.6 g of a solution obtained by diluting ethanol with 5.0% by mass of oleic acid was added as a dispersant to the slurry containing silver powder obtained, followed by full stirring and aging. The amount of the oleic acid added was 0.4% by mass with respect to the mass of the silver powder. The aged slurry was subjected to filtration and water washing, and then dried at 73° C. for 10 hours using a vacuum dryer. Subsequently, disintegration was performed, thus spherical silver powder of Example 2 was obtained.

Figure 3:
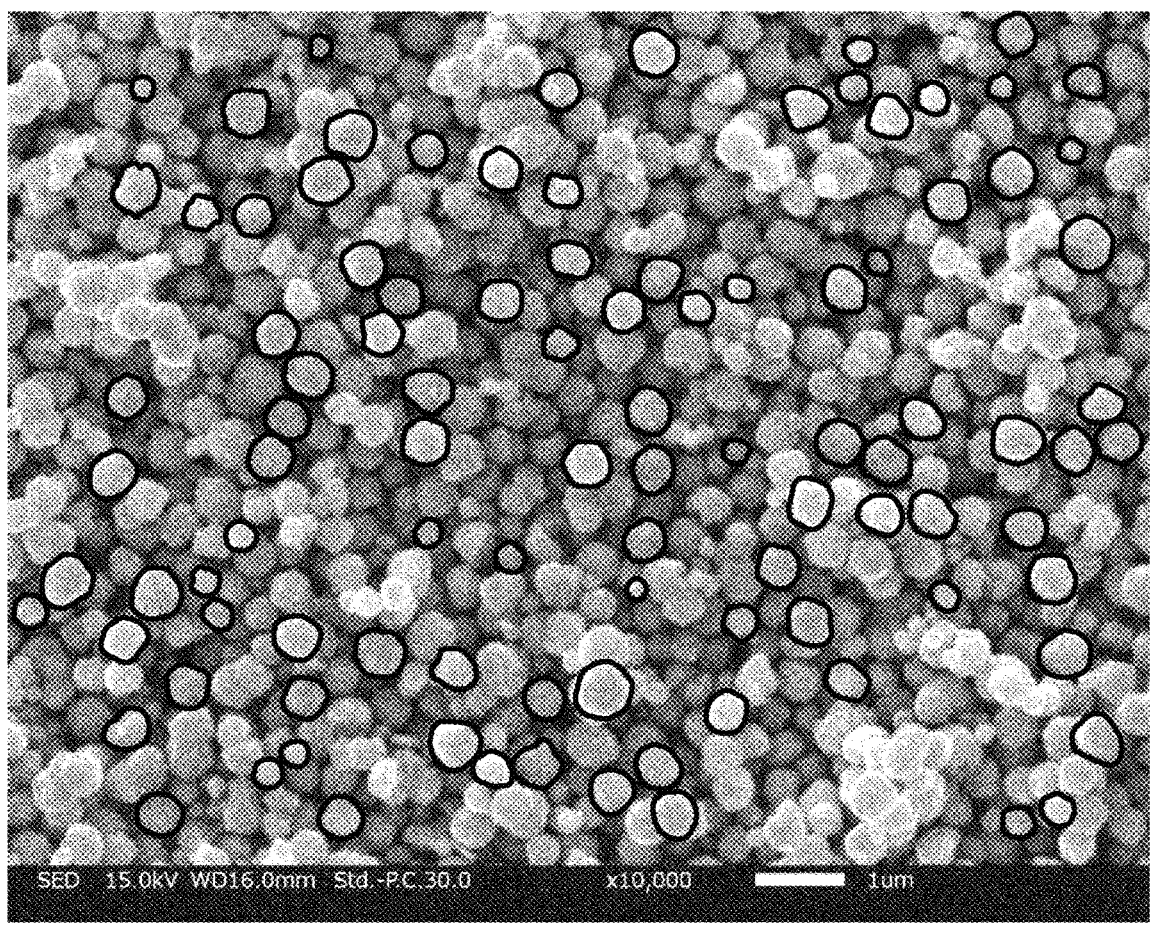
FIG. 3 is a SEM micrograph of spherical silver powder obtained in Example 2.
Figure 4:
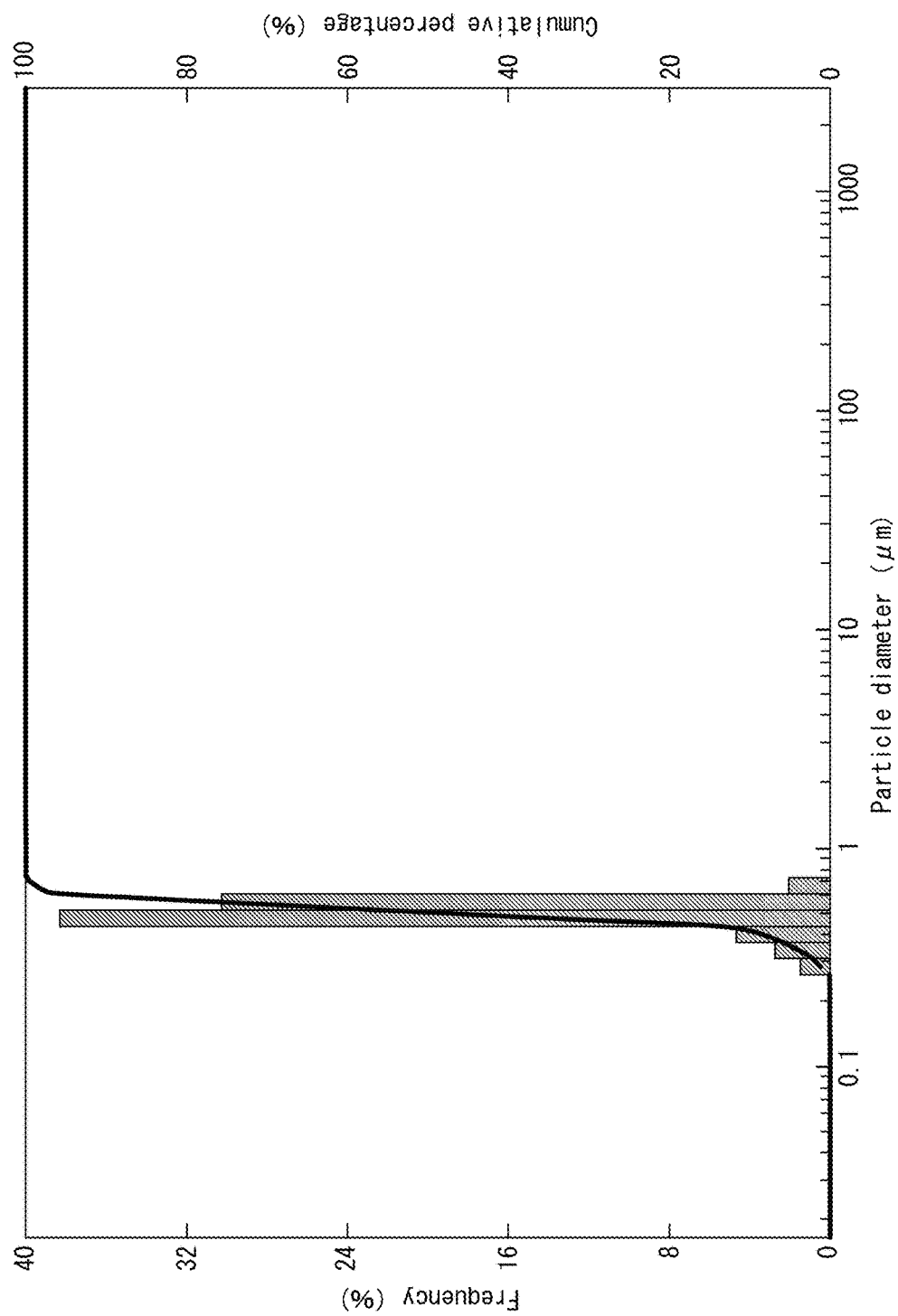
FIG. 4 gives the results of particle size distribution analysis of primary particle diameters in the SEM micrograph obtained in Example 2.

The spherical silver powder obtained in Example 2 was micrographed at 10000× magnification using a scanning electron microscope (SEM). The image taken is given in FIG. 3. Further, the resultant SEM image of Example 2 was subjected to Mac-View analysis in the same manner as in Example 1. The results plotted as a particle size distribution are given in FIG. 4. The results demonstrated that the particle diameter (D50) at a cumulative percentage of 50% was 0.50 μm, the standard deviation of the particle size distribution was 0.069 μm, and the variation coefficient was 0.138.

Comparative Example 1

A silver ammine complex aqueous solution was obtained by preparing 3.2 L of a silver nitrate aqueous solution containing 0.12 mol/L of silver ions and adding 137.7 g (2.7 molar equivalents per silver) of aqueous ammonia with a concentration of 28% by mass to the silver nitrate aqueous solution. Further, 11.8 g of an aqueous solution containing 80% by mass of hydrazine (1.8 molar equivalents per the amount of silver) was diluted with 123.3 g of purified water to obtain a reductant. The liquid temperature of the silver ammine complex aqueous solution was kept at 30.0° C. and the reductant was mixed into the silver ammine complex aqueous solution fully stirred, thereby obtaining a slurry containing silver powder. We found that discoloration of the solution started shortly (0.3 s) after the mixing and a reduction precipitation reaction occurred.

Further, 3.6 g of a solution obtained by diluting ethanol with 5.0% by mass of oleic acid was added as a dispersant to the slurry containing silver powder obtained, followed by full stirring and aging. The amount of the oleic acid added was 0.4% by mass with respect to the mass of the silver powder. The aged slurry was subjected to filtration and water washing, and then dried at 73° C. for 10 hours using a vacuum dryer. Subsequently, disintegration was performed, thus spherical silver powder of Comparative Example 1 was obtained.

Figure 5:
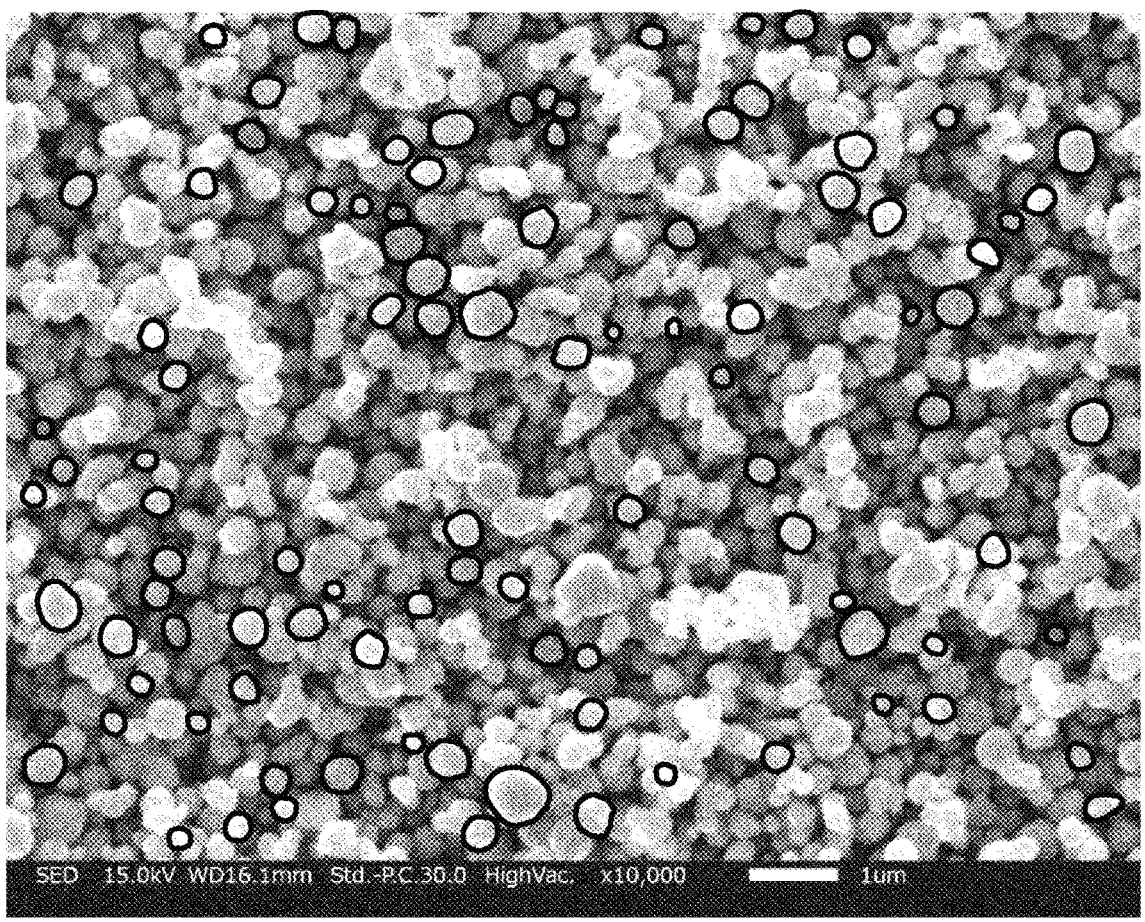
FIG. 5 is a SEM micrograph of spherical silver powder obtained in Comparative Example 1.
Figure 6:
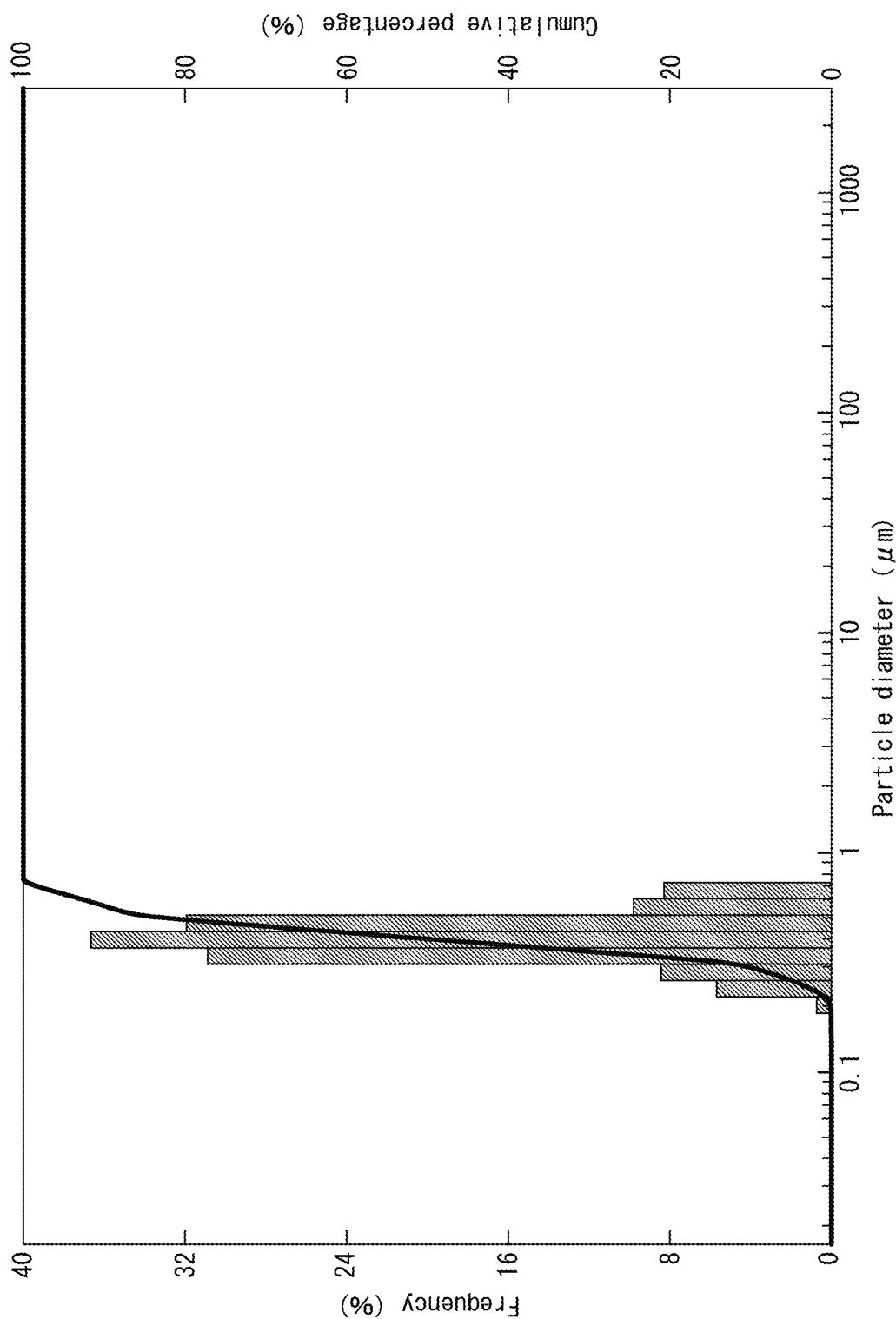
FIG. 6 gives the results of particle size distribution analysis of primary particle diameters in the SEM micrograph obtained in Comparative Example 1.

The spherical silver powder obtained in Comparative Example 1 was micrographed at 10000× magnification using a scanning electron microscope (SEM). The image taken is given in FIG. 5. Further, the resultant SEM image of Comparative Example 1 was subjected to Mac-View analysis in the same manner as in Example 1. The results plotted as a particle size distribution are given in FIG. 6. The results demonstrated that the particle diameter (D50) at a cumulative percentage of 50% was 0.40 μm, the standard deviation of the particle size distribution was 0.096 μm, and the variation coefficient was 0.238.

The particle size characteristics of the silver powders obtained in Examples and Comparative Example above are given in Table 1. The table indicates that primary particle diameter in Example 1 was small and the that the primary particle diameter in Example 2 was large as compared with those in Comparative Example 1. However, the variation coefficient in either Example was smaller than that in Comparative Example 1. Thus, when hydrazine carbonate is used as a reductant, the primary particle diameters will be uniform regardless of whether the particle size is large or small.

TABLE 1

| | SEM primary particle diameter D50 (μm) | Standard deviation σ (μm) | Variation coefficient σ/D50 |
|---|---|---|---|
| Example 1 | 0.339 | 0.063 | 0.185 |
| Example 2 | 0.501 | 0.069 | 0.137 |
| Comparative Example 1 | 0.403 | 0.096 | 0.238 |

It was found that this disclosure made the variation of the primary particle diameters small without using an expensive reagent or a complicated step unlike in conventional production methods. It was also confirmed that effluent treatment could be performed in the same manner as in the case of using a conventional hydrazine aqueous solution.

Further, the spherical silver powders prepared using hydrazine carbonate according to Examples and Comparative Example above were found to have smaller particle size distribution width in terms of the primary particle diameters than conventional spherical silver powders without significantly increasing the production cost. Thus, particles having primary particle diameters with little variation can be prepared.

INDUSTRIAL APPLICABILITY

As described above, spherical silver powders prepared according to this disclosure were found to have uniform primary particle diameters. Thus, the silver particle powder is expected to allow intended powder characteristics to be easily achieved and allow for the production of paste used to form a conductive pattern having higher density and a finer line.

The invention claimed is:

1. A method of producing spherical silver powder, comprising a reduction precipitation step of precipitating silver particles by reduction by adding a reductant including hydrazine carbonate to an aqueous reaction system containing silver ions,
wherein a cumulative 50% particle diameter D50 of SEM primary particle diameters of the resultant spherical silver powder is 0.1 μm to 1.5 μm, and a variation coefficient of the SEM primary particle diameters in a particle size distribution is 0.2 or less, where the variation coefficient is obtained by dividing the standard deviation of the particle size distribution found from the SEM primary particle diameters by D50.

2. The method of producing spherical silver powder, according to claim 1, wherein an amount of the hydrazine carbonate added in the reduction precipitation step is 1 to 6 molar equivalents per silver.

3. The method of producing spherical silver powder, according to claim 1,
wherein the aqueous reaction system containing the silver ions is a silver ammine complex, and
the silver ammine complex is prepared by adding one of aqueous ammonia and ammonium salt to an aqueous solution containing at least one of silver nitrate, a silver complex, and a silver intermediate.

4. The method of producing spherical silver powder, according to claim 1,
wherein a temperature of the aqueous reaction system containing the silver ions when the reductant is added in the reduction precipitation step is 10° C. to 50° C.

\* \* \* \* \*